(No Model.)
J. SHEPHERD & J. V. MILLER.
HOSE CLAMP.
No. 255,465. Patented Mar. 28, 1882.
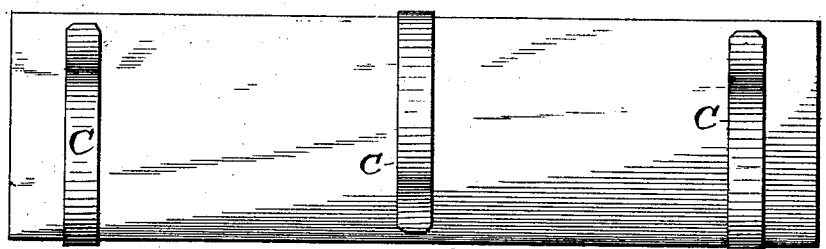
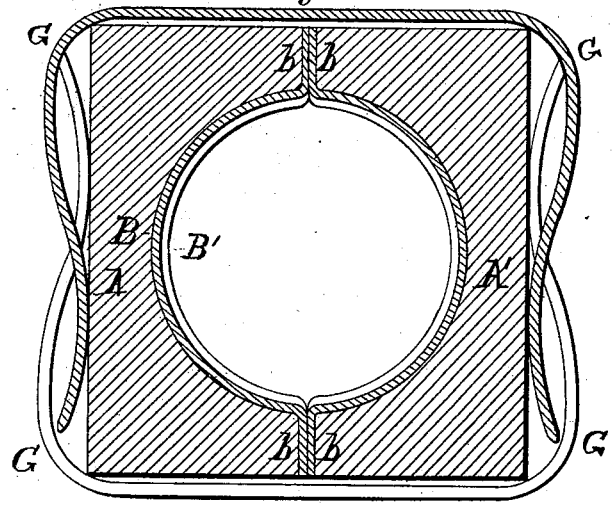
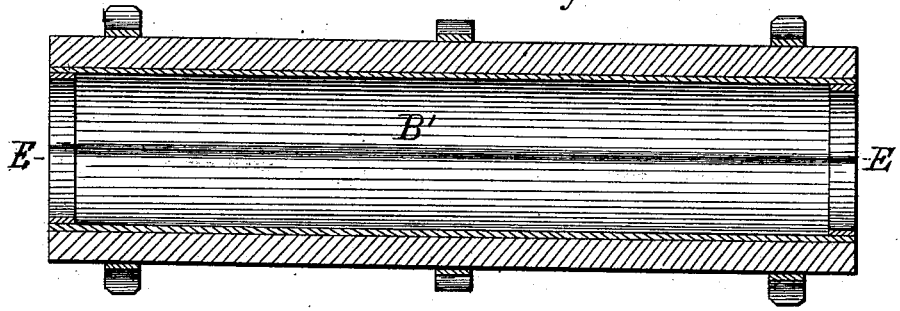

UNITED STATES PATENT OFFICE.

JOHN SHEPHERD AND JULIUS V. MILLER, OF MACON CITY, MISSOURI.

HOSE-CLAMP.

SPECIFICATION forming part of Letters Patent No. 255,465, dated March 28, 1882.

Application filed December 13, 1881. (No model.)

*To all whom it may concern:*

Be it known that we, JOHN SHEPHERD and JULIUS V. MILLER, citizens of the United States, residing at Macon City, in the county of Macon and State of Missouri, have invented certain new and useful Improvements in Hose-Clamps, of which the following is a specification, reference being had therein to the accompanying drawings.

Our invention relates to a device which we designate a "hose-clamp."

The device is designed as a ready appliance for quickly repairing fire-hose burst at fires, or other water-conducting hose, where in actual use, by pressure of water; and it consists in the semi-cylindrical blocks A and A', having secured therein the packing-cylinder B, the spring-clamps C C, and in the combination and arrangement of the parts, as hereinafter more fully specified.

In the drawings, Figure 1 is a side elevation, showing the arrangement of the spring-clamps. Fig. 2 is a view of my device in cross-section, and Fig. 3 is a sectional side elevation thereof.

The letters A A' represent sections of a clamp, which together form an interior cylindrical orifice, the sections being divided longitudinally, and having a rectangular outer surface. To each section of the cylinder is secured, by screws or other ordinary mechanical expedient, an interior lining, B', made of rubber, gutta-percha, leather, or other pliable water-proof material, and near the ends of the cylinder the annular ridge E is provided, which is designed in practice to render the cylinder water-tight. The longitudinal ends $b\ b$ of this lining material are projected across the cylinder and caused to fit flush with the outer plane of the rectangle on two of its sides, as shown at $b\ b$, and hence when the sections A and A' are caused to encircle the burst hose and clamped together by the spring-clamps C C these longitudinal ends of the lining are compressed together, and escape of fluid from between the sections is thus prevented. The spring-clamps C C are curved at the corners G G outwardly from the rectangle, in order better to compress and hold rigidly the sections, which are square in cross-section, and their ends are projected from the sides of the rectangle to render them more easily manipulated.

We do not limit ourselves either as to the length of this clamp or as to the number of the springs which we employ to secure the sections together, or as to diameter of cylindrical orifice; but for the purpose of closing rent or burst fire-hose or other water-conducting hose, we construct the same as shown, with a spring-clamp in the center and one at either end of the sections A and A'.

The rings or annular projections E E, which are molded with the lining, are designed to compress the hose more tightly than the other parts of the clamp, and thus prevent the escape of the fluid from either end of the sections.

What we claim, and desire to secure by Letters Patent, is—

The combination of the sections A A', linings B', having longitudinal ends $b\ b$ and annular projections E E, and spring-clamps C, substantially as shown, and for the purpose described.

In testimony whereof we affix our signatures in presence of two witnesses.

JOHN SHEPHERD.
    JULIUS V. MILLER.

Witnesses:
 JAS. G. HOWE,
 D. E. WILSON.